US009886282B2

(12) United States Patent
Canterbury et al.

(10) Patent No.: US 9,886,282 B2
(45) Date of Patent: Feb. 6, 2018

(54) COMPUTER BIOS PROTECTION AND AUTHENTICATION

(75) Inventors: Stephen A. Canterbury, Antioch, IL (US); Vernon W. Hamlin, Lisle, IL (US); Scot W. Salzman, Buffalo Grove, IL (US); Jorge L. Shimabukuro, Las Vegas, NV (US); Craig J. Sylla, Round Lake, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 981 days.

(21) Appl. No.: 13/280,964

(22) Filed: Oct. 25, 2011

(65) Prior Publication Data

US 2012/0208619 A1 Aug. 16, 2012

Related U.S. Application Data

(60) Provisional application No. 61/406,462, filed on Oct. 25, 2010, provisional application No. 61/481,566, filed on May 2, 2011.

(51) Int. Cl.
*G06F 9/44* (2006.01)
*G06F 21/57* (2013.01)
(Continued)

(52) U.S. Cl.
CPC .......... *G06F 9/4401* (2013.01); *G06F 21/572* (2013.01); *G06F 21/575* (2013.01); *G06F 21/64* (2013.01); *G07F 17/3227* (2013.01)

(58) Field of Classification Search
CPC ..... G07F 17/32; G07F 17/3241; G06F 21/575
(Continued)

(56) References Cited

U.S. PATENT DOCUMENTS 5,701,478 A 12/1997 Chen
5,892,943 A 4/1999 Rockford et al.
(Continued)

FOREIGN PATENT DOCUMENTS

EP 1665038 1/2008
EP 1962221 8/2008
(Continued)

OTHER PUBLICATIONS

U.S. Appl. No. 13/280,930, filed Oct. 25, 2011, Salzman, Scot W.
(Continued)

*Primary Examiner* — Jason Skaarup
(74) *Attorney, Agent, or Firm* — DeLizio Law, PLLC

(57) ABSTRACT

In some embodiments, a wagering game machine includes: a carrier board comprising a first network port and a second network port, the first network port having a first network address and the second network port having a second network address; a processor located on the carrier board; a first nonvolatile memory located on the carrier board and communicatively coupled to the first network port, the first nonvolatile memory configured to store the first network address; and a second nonvolatile memory located on the carrier board, wherein the second nonvolatile memory is configured to store Basic Input and Output System (BIOS) code that includes a system BIOS code and an application BIOS code, wherein the BIOS code is hardware write-protected, wherein the processor is configured to derive the second network address from the first network address during execution of boot-up operations of the apparatus.

8 Claims, 11 Drawing Sheets

(51) Int. Cl.
  *G06F 21/64* (2013.01)
  *G07F 17/32* (2006.01)
(58) Field of Classification Search
  USPC ................................................ 463/29, 40–43
  See application file for complete search history.

(56) References Cited

U.S. PATENT DOCUMENTS

| | | | |
|---|---|---|---|
| 6,029,046 A | 2/2000 | Khan et al. | |
| 6,161,177 A | 12/2000 | Anderson | |
| 6,425,079 B1 | 7/2002 | Mahmoud | |
| 6,658,562 B1 | 12/2003 | Bonomo et al. | |
| 6,816,974 B1 | 11/2004 | Nurmi et al. | |
| 7,111,202 B2 | 7/2006 | Cagle et al. | |
| 7,108,605 B2* | 9/2006 | LeMay et al. | 463/43 |
| 7,231,513 B1* | 6/2007 | Eydelberg | G06F 21/31 |
| | | | 713/166 |
| 7,366,922 B2 | 4/2008 | Takeda et al. | |
| 7,464,256 B2 | 12/2008 | Muir | |
| 8,166,308 B2 | 4/2012 | Smith et al. | |
| 8,311,042 B2* | 11/2012 | Nath | H04L 29/12028 |
| | | | 370/395.3 |
| 8,392,697 B1 | 3/2013 | Natarajan | |
| 8,425,332 B2 | 4/2013 | Walker et al. | |
| 9,122,492 B2 | 9/2015 | Salzman | |
| 2004/0205364 A1* | 10/2004 | Lai | 713/300 |
| 2005/0111664 A1 | 5/2005 | Ritz et al. | |
| 2005/0143177 A1 | 6/2005 | Takeda et al. | |
| 2005/0154850 A1 | 7/2005 | Collins | |
| 2006/0046855 A1* | 3/2006 | Nguyen et al. | 463/43 |
| 2006/0069906 A1* | 3/2006 | Zolnowsky | G06F 9/4403 |
| | | | 713/2 |
| 2006/0100010 A1 | 5/2006 | Gatto et al. | |
| 2006/0160626 A1* | 7/2006 | Gatto et al. | 463/43 |
| 2006/0200539 A1* | 9/2006 | Kappler | G06F 9/4416 |
| | | | 709/220 |
| 2006/0265580 A1 | 11/2006 | Dennis et al. | |
| 2006/0288200 A1* | 12/2006 | Morrow | G06F 11/006 |
| | | | 713/1 |
| 2006/0294349 A1 | 12/2006 | Spottswood | |
| 2007/0150937 A1 | 6/2007 | Gatto et al. | |
| 2008/0028235 A1* | 1/2008 | Smith | G06F 21/575 |
| | | | 713/190 |
| 2008/0172557 A1 | 7/2008 | Crowder et al. | |
| 2008/0287199 A1* | 11/2008 | Macika et al. | 463/43 |
| 2009/0013166 A1 | 1/2009 | Crowder, Jr. et al. | |
| 2009/0182995 A1 | 7/2009 | Muir | |
| 2010/0064031 A1* | 3/2010 | Wright et al. | 709/220 |
| 2010/0174866 A1 | 7/2010 | Fujimoto et al. | |
| 2010/0178977 A1 | 7/2010 | Kim et al. | |
| 2010/0217992 A1* | 8/2010 | Hamlin | G06F 21/34 |
| | | | 713/176 |
| 2011/0029766 A1 | 2/2011 | Sever et al. | |
| 2011/0060899 A1 | 3/2011 | Hsieh et al. | |
| 2011/0113225 A1 | 5/2011 | Lu et al. | |
| 2011/0119474 A1 | 5/2011 | Singh et al. | |
| 2011/0131401 A1* | 6/2011 | Singh | G06F 21/31 |
| | | | 713/2 |
| 2012/0208633 A1 | 8/2012 | Salzman | |
| 2015/0371495 A1 | 12/2015 | Salzman | |

FOREIGN PATENT DOCUMENTS

| | | |
|---|---|---|
| EP | 2044546 | 4/2009 |
| WO | WO-2005026951 | 3/2005 |
| WO | WO-2005081122 | 9/2005 |
| WO | WO-2008009112 | 1/2008 |
| WO | WO-2008054134 | 5/2008 |

OTHER PUBLICATIONS

Intel, "Datasheet", *Intel Core i5-600, i3-500 Desktop Processor Series, Intel Pentium Processor G6950* vol. 1 Aug. 2010, 104 pages.
Intel, "Datasheet", *Intel Core i7-800 and i5-700 Desktop Processor Series* vol. 1 Jul. 2010, 94 pages.
Intel, "Datasheet", *Intel Core i7-900 Desktop Processor Extreme Edition Series and Intel Core i7-900 Desktop Processor Series* vol. 1 Feb. 2010, 96 pages.
Intel, "Datasheet", *Intel Core i7-800 and i5-700 Desktop Processor Series* vol. 2 Sep. 2009, 300 pages.
Intel, "Datasheet", *Intel Core i5-600, i3-500 Desktop Processor Series and Intel Pentium Processor G6950* vol. 2 Jan. 2010, 366 pages.
Intel, "Datasheet", *Intel Core i7-900 Desktop Processor Extreme Edition Series and Intel Core i7-900 Desktop Processor Series* vol. 2 Oct. 2009, 98 pages.
Intel, "Thermal and Mechanical Design Guide", *Intel Core i7-900 Desktop Processor Extreme Edition Series and Intel Core i7-900 Desktop and Intel Core i7-900 Desktop Processor Series and LGA1366 Socket* Mar. 2010, 68 pages.
Intel, "Thermal/Mechanical Specifications and Design Guidelines", *Intel Core i7-800 and i5-700 Desktop Processor Series and LGA1156 Socket* Sep. 2009, 102 pages.
Intel, "Thermal/Mechanical Specifications and Design Guidelines", *Intel Core i5-600, i3-500 Desktop Processor Series, Intel Pentium Processor G6950 and LGA1156 Socket* Jan. 2010, 108 pages.
Co-Pending U.S. Appl. No. 14/841,418, filed Aug. 31, 2015, 35 pages.
"U.S. Appl. No. 13/280,930 Office Action", dated Oct. 23, 2014, 27 Pages.
"U.S. Appl. No. 13/280,930 Office Action", dated Apr. 23, 2014, 31 Pages.

\* cited by examiner

COMPUTER BIOS PROTECTION AND AUTHENTICATION

RELATED APPLICATIONS

This application claims the priority benefit of U.S. Provisional Application Ser. No. 61/406,462 filed Oct. 25, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to computer systems, and more particularly to protection and authentication of data in computer systems.

BACKGROUND

Protection and authentication of data stored in a computer is important in a number of different applications. In particular, it is vital that data in a computer be protected from being hacked, modified, deleted, etc. One such application includes a wagering game machine. Gaming regulations for the wagering game industry require that the data stored in the wagering game machines be protected. Also, these regulations require that the data stored in the wagering game machines be authenticated at various times (including during the initial installation at the wagering game establishment). One set of data that requires protection and authentication by gaming regulations is the Basic Input/Output System (BIOS) that is executed as part of the boot up operations, after the computers are initially powered on, restarted, etc.

BRIEF DESCRIPTION OF THE FIGURES

Embodiments of the invention are illustrated in the Figures of the accompanying drawings in which.

DESCRIPTION OF THE EMBODIMENTS

Figure 1:
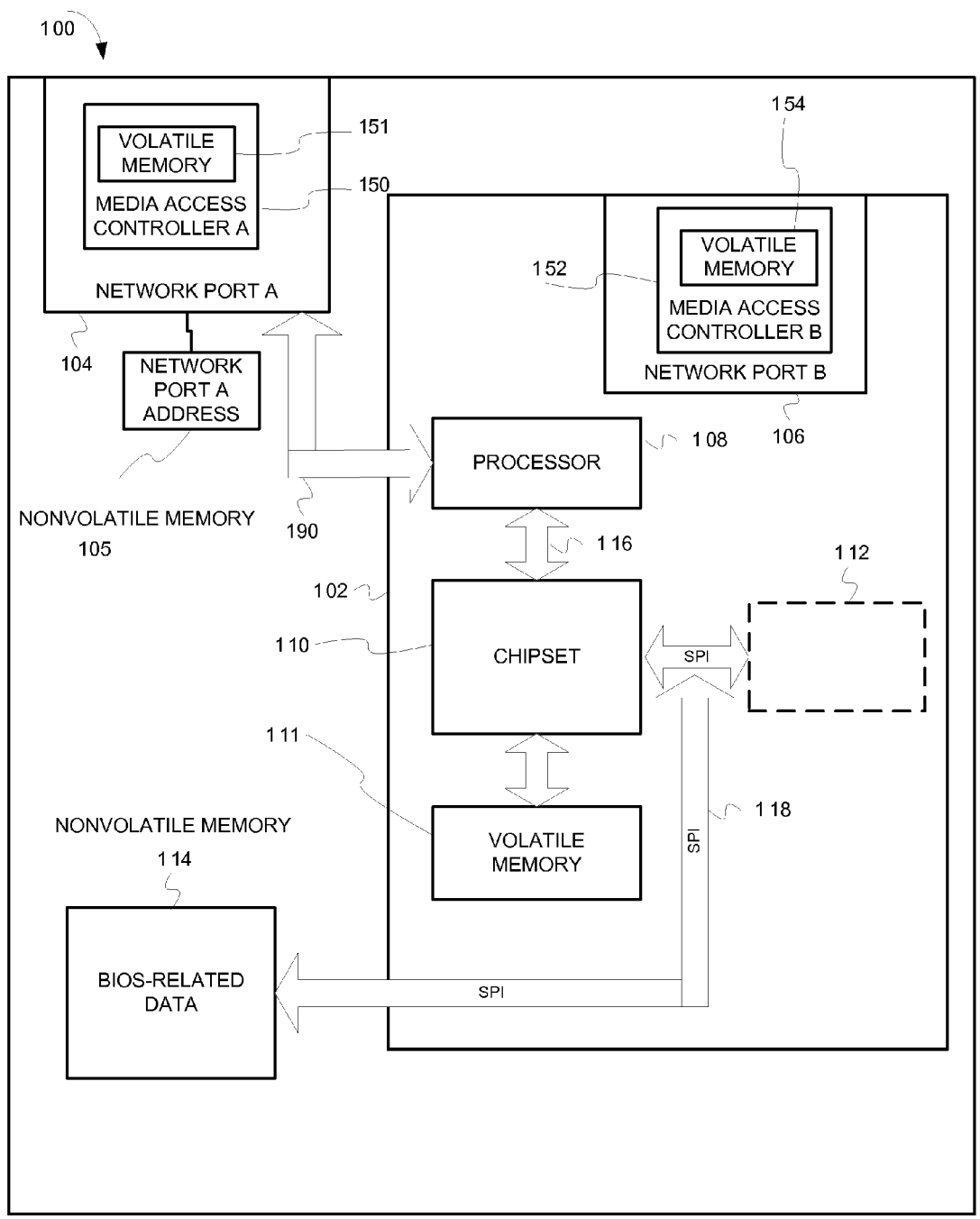
FIG. 1 is a block diagram illustrating a computer architecture providing protected and authenticated BIOS code, according to some example embodiments.

This description of the embodiments is divided into seven sections. The first section provides an introduction to some example embodiments, while the second section describes example computer architectures. The third section describes example memory mapping for different memories in a computer. The fourth section describes example operations performed by some embodiments, while the fifth section describes an example physical representation of a nonvolatile memory. The sixth section describes wagering game machine architectures and wagering game networks and the seventh section presents some general comments.

INTRODUCTION

This section provides an introduction to some example embodiments that provide protection and authentication of a computer basic input/output system ("BIOS"). The computer BIOS can be used in any of a number of computers, machines, apparatuses, etc. In an example application, the BIOS is part of a wagering game machine.

Some example embodiments provide a chain of trust for the code being executed in a computer. A computer architecture includes a processor, chipset and a nonvolatile memory that stores the BIOS. This nonvolatile memory is configured to store the BIOS code that includes a system BIOS and an application BIOS. The application BIOS can be a universal BIOS extension to be executed as part of the boot up operations along with the system BIOS. In contrast to conventional architectures, in some example embodiments, the BIOS code stored in the nonvolatile memory is write-protected to prevent the code from being modified, deleted, hacked, etc.

This nonvolatile memory resides on a carrier board (also known as a motherboard, system printed circuit board, baseboard, main board, etc.). In some example embodiments, the nonvolatile memory is configured for placement in a socket of the carrier board. Also, the nonvolatile memory can be removed from the socket for independent authentication of the data stored therein. For example, the nonvolatile memory can be placed in a trusted verification device (e.g., devices manufactured by Kobetron Inc. of Navarre, Fla., Gaming Laboratories International Inc. (GLI) of Toms River, N.J., Dataman Programmer Ltd. of Orange City, Fla., etc.). The trusted verification device can then produce a digital signature based on the data that is stored therein. This device can compare the digital signature to a known valid digital signature. Once authenticated, the BIOS code stored therein can be considered the beginning of a chain of trust.

This authentication by a trusted verification device can occur at different times. For example, the authentication can occur when the computer is initially installed, at different times while the computer is in the field, etc. For example, for wagering game machines, gaming regulations require that this authentication occur at least during the initial installation at a wagering game establishment. Thus, a technician may manually remove the nonvolatile memory and authenticate the BIOS. In another example, this authentication can be required after a certain level of win—a big win. A big win can be defined relative to any monetary amount and can vary between different types of wagering game machines. For example, a big win on wagering game machine A can be $10,000, and a big win on wagering game machine B can be $25,000. An authentication after a big win can help ensure that no person or program has tampered with or altered this chain of trust in the wagering game machine to illegally obtain the win.

The chain of trust can continue during the boot operations. While a wagering game machine boots-up, as part of the execution of the application BIOS, the processor authenticates both the system BIOS and the application BIOS stored in this nonvolatile memory. Such authentication can include generating a digital signature over the BIOS code and then validating the generated digital signature to ensure that the BIOS code has not been modified. Also in the chain of trust, as part of the execution of the application BIOS, the processor authenticates the bootable device (e.g., compact FLASH, hard disk drive, solid state drive, Universal Serial Bus (USB) flash drive, etc.).

In some example embodiments, the processor and chipset are on a Computer on Module Express (COMe) that is mounted on the carrier board, whereas the nonvolatile memory is mounted directly on the carrier board. The computer architecture can include at least two network ports. In some example embodiments, a first network port is on the carrier board and a second network port is on the COMe. The first network port and the second network port have two different network addresses. In some example embodiments, these two different network addresses are selected from a group of network addressed pre-assigned by a standards organization (e.g., Institute of Electrical and Electronics Engineers (IEEE)). The network address for the first network port is pre-stored on an associated nonvolatile memory different from the nonvolatile memory that stores the BIOS. In some example embodiments, during or after boot operations, the second network port receives its assigned network address. The network address for the second network port can be derived from the first network address. The processor can perform this assignment of the second network address at different times during the start up of the computer. For example, the assignment of the second network address can occur during execution of the application BIOS, during execution of the system BIOS, during initiation of the operating system, etc.

As noted in the paragraph directly above, some embodiments determine port network addresses based on information that is not stored with the BIOS code (i.e., information not stored in the same nonvolatile memory that stores BIOS). In contrast, some conventional architectures store network address information in the same nonvolatile memory device that stores the BIOS code (e.g., the system BIOS and application BIOS). Network addresses for different ports must be unique to ensure proper communications. Therefore, if these unique addresses are stored in a nonvolatile memory device with BIOS code, the data (i.e., BIOS code and network addresses) on each nonvolatile memory device will be different. If data are different for each nonvolatile memory device, verifying the data may be difficult. However, if BIOS code and data are the same across nonvolatile memory devices, a verification device (e.g., a device manufactured by Kobetron Inc. of Navarre, Fla.) can verify all BIOS/data using one digital signature for all nonvolatile memory devices. If BIOS code and data are different across nonvolatile memory devices, the verification device must determine a different digital signature for each device before it can verify the device's digital signature.

In the wagering game industry, gaming regulations require that the nonvolatile memory that stores BIOS code be independently verified using a trusted verification device. To do this, technicians remove the nonvolatile memory device that stores the BIOS code, and verify the digital signatures that are associated with the BIOS code and other data on the nonvolatile memory device. Having the same data image across all nonvolatile memory devices allows the authentication to use the same digital signature across multiple wagering game machines.

Computer Architectures

This section describes example computer architectures and presents structural aspects of some embodiments. FIG. 1 is a block diagram illustrating a computer architecture providing protected and authenticated BIOS code, according to some example embodiments. FIG. 1 includes a carrier board 100. The carrier board 100 is also known as a motherboard, system printed circuit board, baseboard, main board, etc. A number of different components can be located on the carrier board 100. In this example embodiment, an embedded computer module 102 is located on the carrier board 100. In some example embodiments, the embedded computer module 102 is compliant with a COM (Computer-On-Module) Express industry standard, issued by PICMG (PCI Industrial Computer Manufacturers Group). COM Express (COMe) can be based on several serial differential-signaling technologies, including PCI Express, Serial Advanced Technology Attachment (SATA), USB 2.0, and Serial Digital Video Out (SDVO).

In some example embodiments, the embedded computer module 102 is compliant with an ETX (Embedded Technology eXtended) Express COM specification. ETX is a PCI/ISA based COM, which offers personal computer (PC) functionality. In further embodiments, the embedded computer module 102 includes a video function, an audio function, an Ethernet function, one or more storage interfaces, and one or more data communication interfaces. Video capabilities can provide for support of dual (or more) independent displays using a single processor.

The embedded computer module 102 includes one or more processors. In this example, the embedded computer module 102 includes a processor 108. The processor 108 can include any suitable processor, such as an Intel® Core™ processor, an Intel® Core™ i5 processor, an Intel® Core™ i7 processor, or other suitable processors.

The embedded computer module 102 also includes a chipset 110. The chipset 110 can be one or more chips to provide an interface to the processor 108. In this example, the chipset 110 is communicatively coupled to the processor 108 through a bus 116 (e.g., front side bus). The chipset 110 can provide an interface to the processor 108 for main memory, graphics controllers, peripheral buses (e.g., Serial Peripheral Interface (SPI), Peripheral Component Interconnect (PCI), Industry Standard Architecture (ISA), Universal Serial Bus (USB), etc.), etc. In this example, a volatile memory 111 is positioned on the embedded computer module 102. The volatile memory 111 can be different types of Random Access Memory (RAM) (e.g., Dynamic RAM (DRAM), Static RAM (SRAM), etc.).

In some example embodiments, a nonvolatile memory 112 is located on the embedded computer module 102. In this example, the nonvolatile memory 112 is unused (e.g., data zeroed out therein) and is soldered onto the embedded computer module 102.

FIG. 1 includes two network ports (a network port A 104 and the network port B 106). In this example, the network port A 104 is located on the carrier board 100, and the network port B is located on the embedded computer module 102. The network port A 104 includes a media access controller A 150 that includes a volatile memory 151 (e.g., a register). The media access controller A 150 is configured to control access to the network port A 104. Also, a nonvolatile memory 105 is located on the carrier board 100. The nonvolatile memory 105 can include an Erasable Programmable Read-Only Memory (EPROM), an Electrically Erasable Programmable Read-Only Memory (EEPROM), etc. The nonvolatile memory 105 stores the network address for the network port A 104. In some example embodiments, the media access controller A 150 does not have the network port A address for the network port A 104 when the computer is without power. Once power is supplied to the media access controller 150, the media access controller A 150 retrieves the network port A address from the nonvolatile memory 105. The media access controller A 150 can then store the network port A address in the volatile memory 151. In some example embodiments, the network port A 104 is disabled at the start of the boot-up of the computer. The processor 108 is communicatively coupled to the network port A 104 through a bus 190. In some example embodiments, the bus 190 is a Peripheral Component Interconnection (PCI) bus.

The network port B 106 includes a media access controller B 152 that includes a volatile memory 154 (e.g., a register). The volatile memory 154 is configured to store the network address for port B. The media access controller B 152 is configured to control access to the network port B 104 based on this network address. In this example embodiment, (unlike the network port A 104) the network port B 106 does not include a corresponding nonvolatile memory for storage of its network address. As further described below, the network address for the network port B 106 is generated based on the network address for the network port A 104 and then stored in the volatile memory 154. For example, the network address for the network port B 106 can be the network address for the network port A 104 plus some offset (e.g., one, one thousand, etc.). In some example embodiments, the network addresses for both the network port A 104 and the network port B 106 are Media Access Control (MAC) or Ethernet-based addresses. Neither the media access controller A 150 nor the media access controller B 152 are configured with their network addresses until the computer is powered on and initialized. Such a configuration precludes remote boot operations by some servers or other device coupled to the computer over a network.

The network port A 104 and the network port B 106 can be Gigabit (Gbit) Ethernet ports (e.g., 1-Gbps Ethernet and/or 10-Gbps Ethernet, etc.). In some example embodiments, the network addresses are be based on IEEE 802.3. In some other embodiments, the network addresses can be based on other communications protocols. In some example embodiments, the network addresses for the network port A 104 and the network port B 106 are preassigned or preallocated by IEEE. Therefore, if the two network addresses are in consecutive order, the network address for the network port B 106 can be generated by adding one to the network address for the network port A 104. A further description of the generating of this network address is set forth below.

The carrier board 100 includes a nonvolatile memory 114. The nonvolatile memory 114 can comprise an EPROM, an EEPROM, etc. The nonvolatile memory 114 is configured to store BIOS-related data. As further described below (see description of FIG. 3), the BIOS-related data can include the system BIOS and the application BIOS. Both the system BIOS and the application BIOS are executed by the processor 108 as part of the boot up operations of the computer. The nonvolatile memory 114 is also configured to store a descriptor region that defines the location of the BIOS code, write protections of the data stored in the nonvolatile memory 114, etc. In some example embodiments, the nonvolatile memory 114 and the unused nonvolatile memory 112 are communicatively coupled to the chipset 110 through a Serial Peripheral Interface (SPI) bus. The SPI bus is a synchronous serial data link in a duplex mode. The components can communicate in a master/slave configuration with a master component and one or more slave components. In some example embodiments, the SPI bus is a four wire serial bus.

In some example embodiments, the nonvolatile memory 114 can store BIOS-related data from multiple vendors. In particular, vendor A can have a first set of BIOS instructions based on its type of components and configurations of the embedded computer module 102. Vendor B can have a second set of BIOS instructions based on its type of components and configurations of the embedded computer module 102. In some example embodiments, the nonvolatile memory 114 stores both the first set of BIOS instructions and the second set of BIOS instructions for the two different vendors. In such a configuration, the embedded computer module 102 comprises components (e.g., hardware) that provide an identification of the type of embedded computer module 102 when a request is made for such information. Therefore, prior to retrieving the system BIOS instructions for execution, the processor 108 calls these components to provide this identification. The processor 108 can then retrieve the associated BIOS instructions for this specific vendor for execution. In such a configuration, while storing more BIOS instructions, this BIOS-related data can still be constant across multiple computers to enable ease of authentication (as described above).

Although not shown, the carrier board 100 and the embedded computer module 102 can include other components. For example, the embedded computer module 102 can include cache, a memory controller, an I/O controller, connectors, etc. For example, in some example embodiments, the embedded computer module 102 can provide external connections for one or more PCI Express lanes, PCI Express Graphics (PEG) links, SATA links, Integrated Drive Electronics (IDE) or Parallel Advanced Technology Attachment (PATA) links, multiple Gigabit (Gbit) Ethernet ports (e.g., including 1-Gbps Ethernet and/or 10-Gbps Ethernet), USB 2.0 ports, low-voltage differential signaling (LVDS) channels, high-definition audio interfaces, channels of SDVO, analog cathode ray tube (CRT) interfaces, analog VGA interfaces, NSTC/PAL, TV-out ports (e.g., SDTV and/or HDTV), SMP and I2C busses, and power and ground I/O, among other things.

In some previous configurations (in contrast to some example embodiments), the nonvolatile memory 112 stored data that included the system BIOS and the application BIOS. Also, in some previous configurations, the nonvolatile memory 112 stored the network address for a network port B 106. These previous configurations may complicate a process for verifying BIOS, as these previous configurations had a different data image on each nonvolatile memory device.

To enable technicians to quickly authenticate nonvolatile memories (storing the BIOS) that are within numerous wagering game machines, all the nonvolatile memories should store the same data and the same digital signature. If the BIOS data and the associated digital signatures were different on each wagering game machine, the authentication process would be cumbersome and slow, as technicians would have to look up unique digital signatures for each particular machine. Therefore, in some example embodiments, because the BIOS data and the associated digital signatures are the same for each nonvolatile memory, technicians can quickly authenticate the BIOS for each of nonvolatile memory across a number of different wagering game machines.

Figure 2:
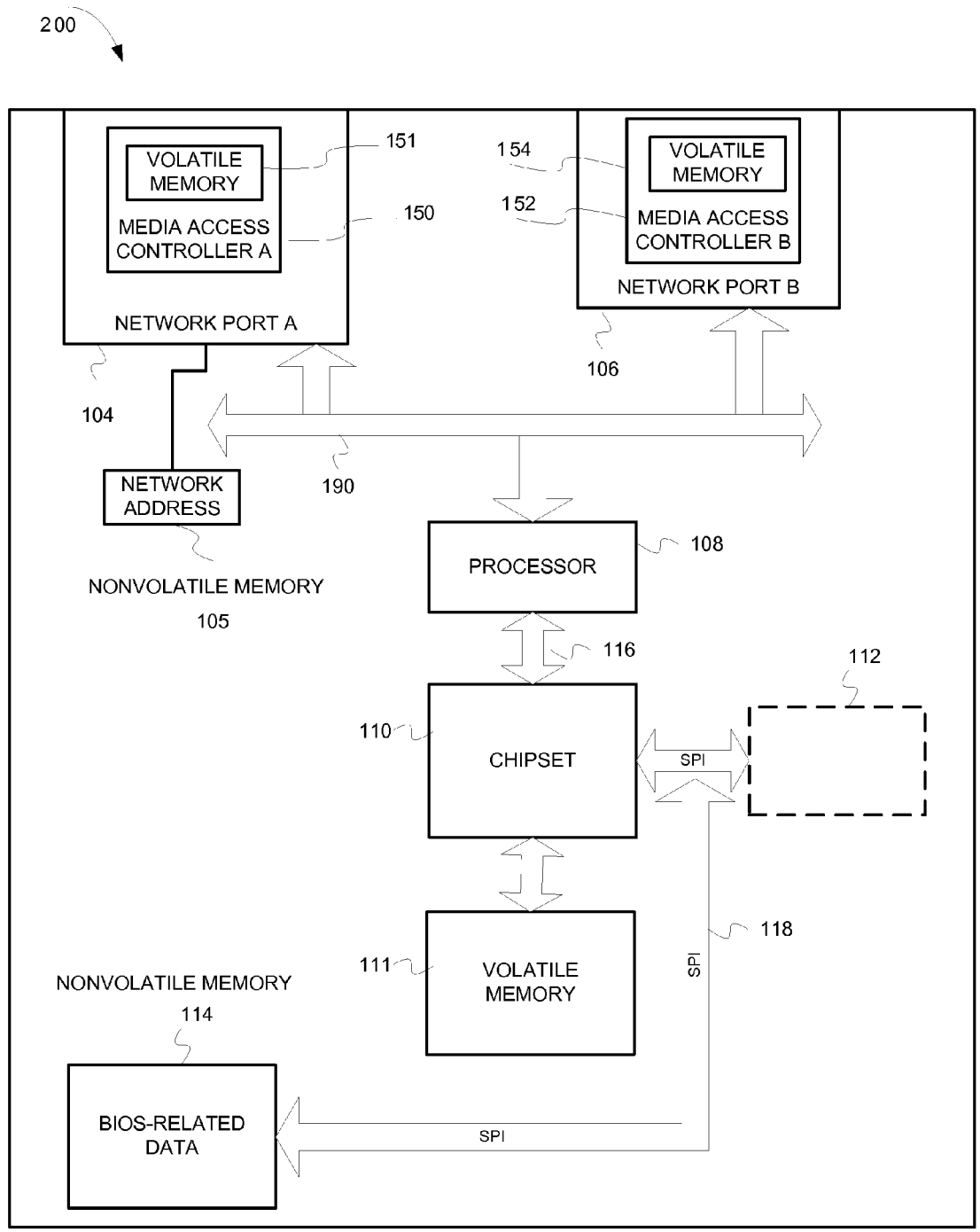
FIG. 2 is a block diagram illustrating a computer architecture providing protected and authenticated BIOS code, according to some other example embodiments.

A different example computer architecture is now described. In particular, FIG. 2 is a block diagram illustrating a computer architecture providing protected and authenticated BIOS code, according to some other example embodiments. FIG. 2 includes a number of same components as FIG. 1. Accordingly, for the same component, a same number is used for both FIGS. 1 and 2. FIG. 2 includes a carrier board 200. The carrier board 200 is also known as a motherboard, system printed circuit board, baseboard, main board, etc. A number of different components can be located on the baseboard 200. In contrast to FIG. 1 in this example embodiment, an embedded computer module is not located on the carrier board 200. Rather, the processor 108, the chipset 110, the volatile memory 111 and the nonvolatile memory 112 are located on the carrier board 200. Also, the network port B 106 is mounted on the carrier board 200, instead of a COMe (like the example embodiment shown in FIG. 1). The processor 108, the network port A 104 and the network port B 106 are communicatively coupled together through the bus 190. In some example embodiments, the computer architectures shown in FIGS. 1-2 are based on any of the Intel® Core™ i3 Processor architecture, the Intel® Core™ i5 Processor architecture, and the Intel® Core™ i7 Processor architecture.

Memory Mapping

This section describes example memory mapping of some embodiments. In particular with reference to FIGS. 1 and 2, FIG. 3 provides example memory mapping for the nonvolatile memory 114 and FIG. 4 provides example memory mapping for the volatile memory 111.

Figure 3:
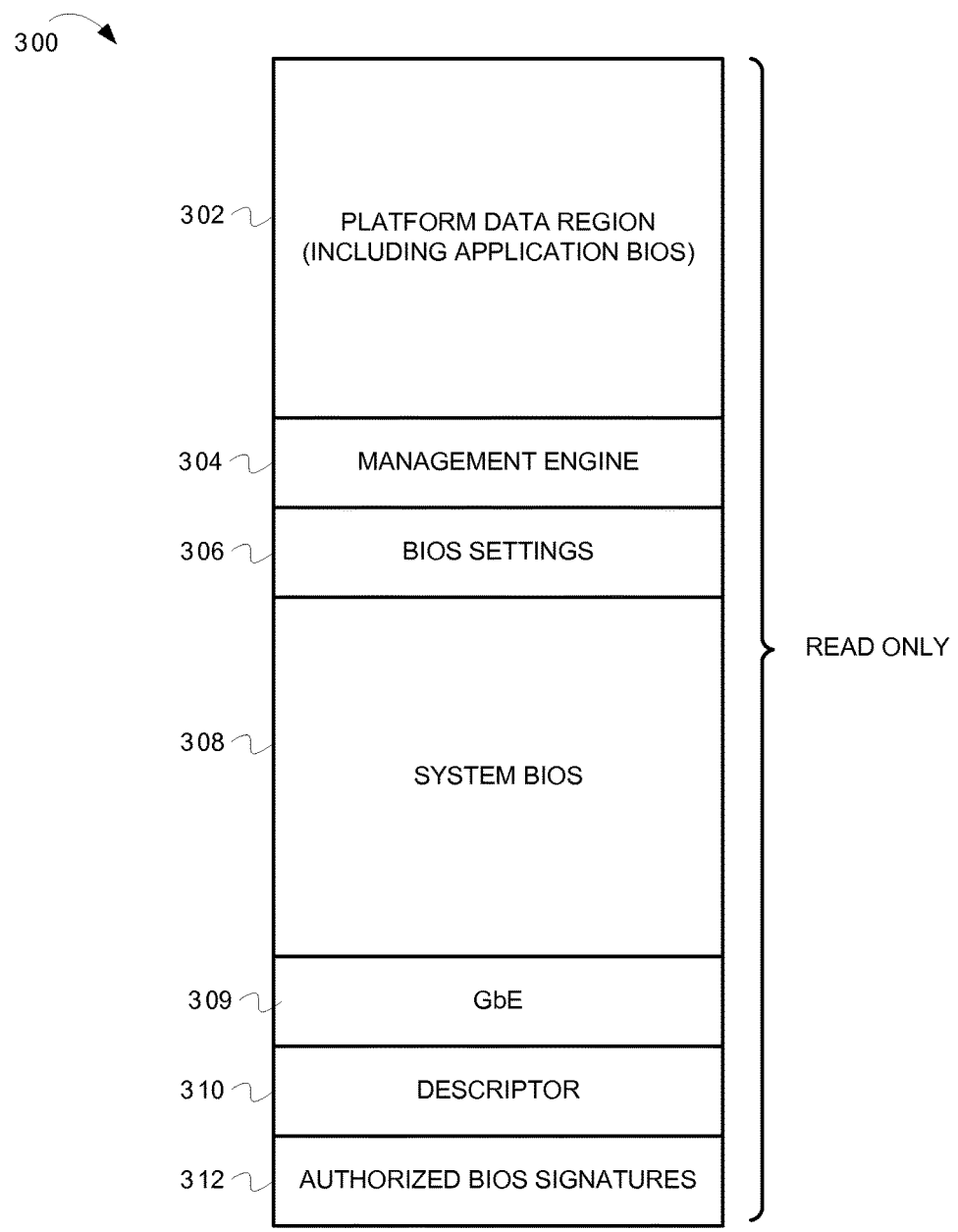
FIG. 3 is a memory map of data (including BIOS code) stored in a nonvolatile memory, according to some example embodiments.
Figure 4:
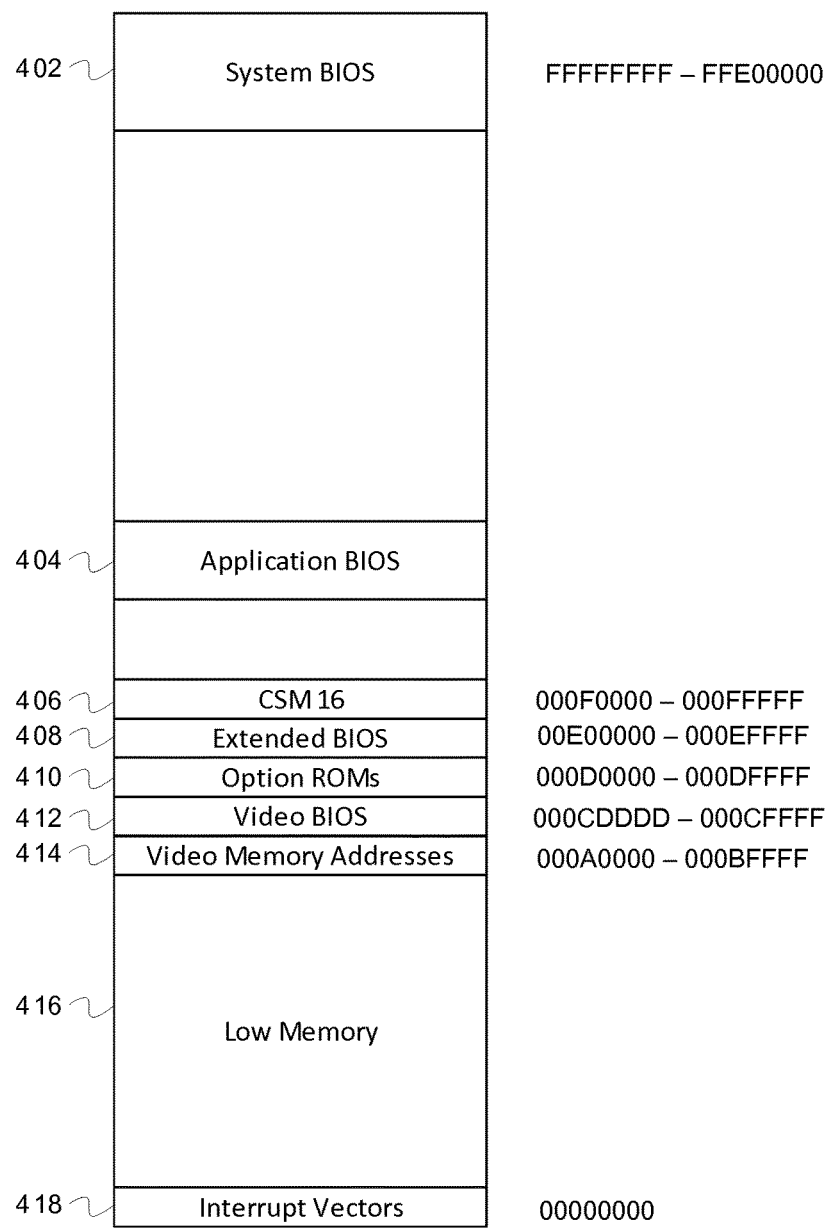
FIG. 4 is a memory map of data loaded into a volatile memory of a computer during operation of the computer, according to some example embodiments.

FIG. 3 is a memory map of data (including BIOS code) stored in a nonvolatile memory, according to some example embodiments. FIG. 3 includes a memory map 300 for data stored in the nonvolatile memory 114 (see FIGS. 1-2). In particular, the data includes BIOS-related data. The memory map 300 includes a Platform Data Region (PDR) 302 configured to store the application BIOS code. The application BIOS code includes BIOS extension instructions that can provide additional functionalities beyond the system BIOS code for a particular application, machine, etc. In this application, the application BIOS code provides protection and authentication of the BIOS instructions (as further described below).

The memory map 300 includes a management engine region 304 configured to store a management engine. The management engine comprises instructions that are loaded into the processor after the computer is initially powered on. Among other operations, the management engine initializes the chipset 110 during the boot-up and prior to completing a restart of the processor 108 (shown in FIG. 1). In some example embodiments, a programmable component (not shown) within the processor 108 executes the management engine to perform its operations. In some example embodiments, neither the management engine nor any other application/component modifies or updates the BIOS-related data stored in the nonvolatile memory 114 during the boot-up. This can be in contrast to some previous architectures that include a management engine. In these previous architectures, the management engine would modify at least a part of the BIOS-related data each time during reboot.

The memory map 300 also includes a BIOS settings region 306 that is configured to store the BIOS settings. The BIOS settings can comprise settings for the system date, system time, a setting for daylight savings, settings for the hard disk drives (e.g., primary master, primary slave, secondary master, secondary slave, etc.), cache, identification of the boot devices, etc.

The memory map 300 includes a system BIOS region 308 that is configured to store the system BIOS instructions. As part of the boot up operations of a computer, the processor retrieves and executes the system BIOS instructions. As part of the execution of the system BIOS instructions, the processor also retrieves and executes the application BIOS instructions.

The memory map 300 includes a Gigabit ethernet (GbE) region 309. In some example embodiments, the GbE region 309 is zeroed out and not used. In previous configurations, the GbE region 309 was configured to store the network address of the network port B 106 (shown in FIG. 1). However, as described herein, this network address has been removed from the nonvolatile memory 114 to ensure that the BIOS-related data stored therein is the same across multiple computers (for ease of authentication, as described above).

The memory map 300 also includes a descriptor region 310 that stores descriptors that define where the system BIOS, the BIOS extension (if any), the management engine, and the BIOS settings are located. In this example, the descriptors would include an identification of the nonvolatile memory 114 and addresses therein for the system BIOS 308, the BIOS extension (the PDR 302), the management engine, and the BIOS settings. The descriptors also define the read and write privileges (e.g., read-only, read/write, etc.) for each of these regions and the descriptor regions 310. In some example embodiments, the PDR 302, the management engine region 304, the BIOS settings region 306, the system BIOS region 308, the descriptor region 310, and a region 312 (described below) are read-only. In some other example embodiments, these regions can have other the read and write privileges.

The memory map 300 includes a region 312 that is configured to store one or more authorized BIOS signatures. The BIOS signature is a digital signature that comprises a hash value representative of all of the data in the nonvolatile memory 114 except for the region 312 storing the authorized BIOS signatures. The hash value can be based on any of the Secure Hash Algorithms (SHA) (e.g., SHA-3, SHA-2, etc.), any of the Message Digest (MD) algorithms (e.g., MD-4, MD-4, etc.), etc. The region 312 can store more than one hash value based on different algorithms, cryptographic keys, etc. to allow the authentication of the data to change over time. A further description of this authentication is set forth below.

An example memory mapping for the volatile memory 111 of FIG. 1 is now described. In particular, FIG. 4 is a memory map of data loaded into a region of a volatile memory of a computer during operation of the computer, according to some example embodiments. In particular, FIG. 4 includes a memory map 400 for data stored in a system region on the volatile memory 111 of FIG. 1. The memory map 400 includes a system BIOS region 402 that is a region that is configured to store the system BIOS that is retrieved from the nonvolatile memory 114 (see the system BIOS region 308 in FIG. 3). In this example, the system BIOS region 402 is defined to be at address space FFFFFFF-FFE00000.

The memory map 400 includes an application BIOS region 404 that is a region configured to store the application BIOS that is retrieved from the nonvolatile memory 114 (see the PDR 302 in FIG. 3). The memory map 400 includes a region 406 that includes CSM 16 region that stores BIOS instructions that are universal across different platforms. Accordingly, the BIOS instructions stored in the region 406 are chipset and platform independent. In this example, the region 406 is defined to be at address space 000F0000-000FFFFF.

The memory map 400 also includes an extended BIOS region 408. In this example, the extended BIOS region 408 is defined to be at address space 00E00000-000EFFFF. The memory map 400 includes an option Read Only Memory (ROM) region 410. The option ROM region 410 can store firmware called by the system BIOS. Examples include firmware for a network boot ROM, Small Computer System Interface (SCSI) controller, etc.

The memory map 400 includes a video BIOS region 412 that is a region that is configured to store the video BIOS for a graphics card of the computer. In this example, the video BIOS region 412 is defined to be at address space 000CDDDD-000CFFFF. The memory map 400 includes a region 414 that is configured to store video memory addresses. In this example, the region 414 is defined to be at address space 000A0000-000BFFFF.

The memory map 400 also includes a low memory region 416 and an interrupt vectors region 418. The interrupt vectors region 418 is a region that is configured to store the memory address of the interrupt handlers for processing of various types of interrupts. In this example, the interrupt vectors region 418 is defined such that the address space starts at 00000000.

Example Operations

This section describes operations associated with some example embodiments. In the discussion below, the flowcharts are described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram. The section describes FIGS. 5-7. The discussion of FIG. 5 describes example operations for loading and executing the system BIOS. The discussion of FIG. 6 describes example operations for loading and executing the BIOS extension (the application BIOS). The discussion of FIG. 7 describes example operations for assigning a network address to a network port based on a network address from a different network port.

Figure 5:
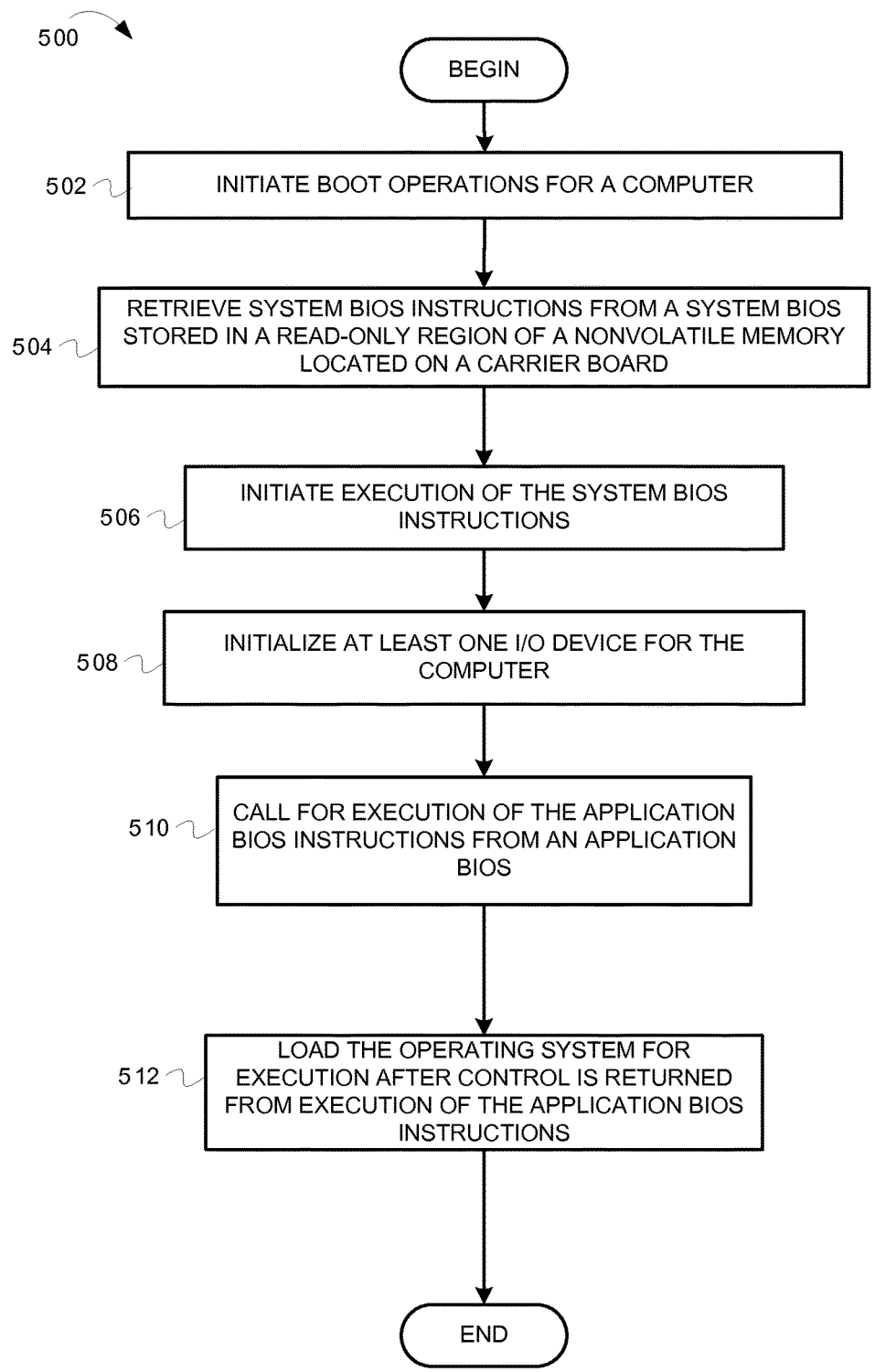
FIG. 5 is a flowchart of operations for execution of system BIOS code for protection and authentication of BIOS code in a computer, according to some example embodiments.

FIG. 5 is a flowchart of operations for execution of system BIOS code for protection and authentication of BIOS code in a computer, according to some example embodiments. A flowchart 500 includes operations that, in some example embodiments, are performed by components of the computer architectures shown in FIGS. 1-2. The operations of the flowchart 500 begin at block 502.

At block 502, the computer is initiated for boot operations. For example, the boot operations can be initiated in response to powering on or restarting the computer. Operations continue at block 504.

At block 504, the processor 108 retrieves system BIOS instructions from a system BIOS stored in a read-only region of the nonvolatile memory 114 located on the carrier board 100. The system BIOS instructions can be loaded into the volatile memory 111 (see example memory map in FIG. 4) from the nonvolatile memory 114. As shown, the nonvolatile memory 114 can be a SPI device, wherein communications between the nonvolatile memory 114 and the chipset 110 are through the SPI bus 118. As noted above, the nonvolatile memory 114 can initiate the chain of trust regarding the BIOS for the computer. In particular, the nonvolatile memory 114 can be removed from a socket on the carrier board 100 prior to the boot operations. The data stored herein (including the system BIOS and the BIOS extension) can be authenticated by a separate trusted verification device (e.g., device manufactured by Kobetron Inc. of Navarre, Fla.). Specifically, the nonvolatile memory 114 can be placed into the trusted verification device. The trusted verification device can then generate a digital signature across the data stored in the nonvolatile memory 114 to determine if data therein is valid. The operations continue at block 506.

At block 506, the processor 108 initiates execution of the system BIOS instructions. The execution of the system BIOS includes a number of different start up operations for the computer. Example operations in response to the execution of the system BIOS are described in the following operations at blocks 508-512. The operations continue at block 508.

At block 508, the processor 108 initializes at least one input/output (I/O) device for the computer. Examples of I/O devices include a graphics card, a hard disk drive, a communications port, a keyboard, etc. In particular, this initialization is part of the execution of the system BIOS. The operations continue at block 510.

At block 510, the processor 108 calls for execution of the application BIOS instructions from an application BIOS. In particular, the application BIOS instructions are a BIOS extension that is to be executed as part of the boot-up operations. This call for execution is also part of the execution of the system BIOS code. Accordingly, the processor 108 executes the application BIOS instructions, wherein control is returned to the system BIOS after the application BIOS has been executed. The execution of the application BIOS is set forth below in the description of FIG. 6. The operations continue at block 512.

At block 512, the processor 108 loads the operating system for execution after control is returned from execution of the application BIOS instructions. This loading of the operating system is also part of the execution of the system BIOS. An example operation performed by the operating system is set forth below in the description of FIG. 7. The operations of the flowchart 500 are complete.

Figure 6:
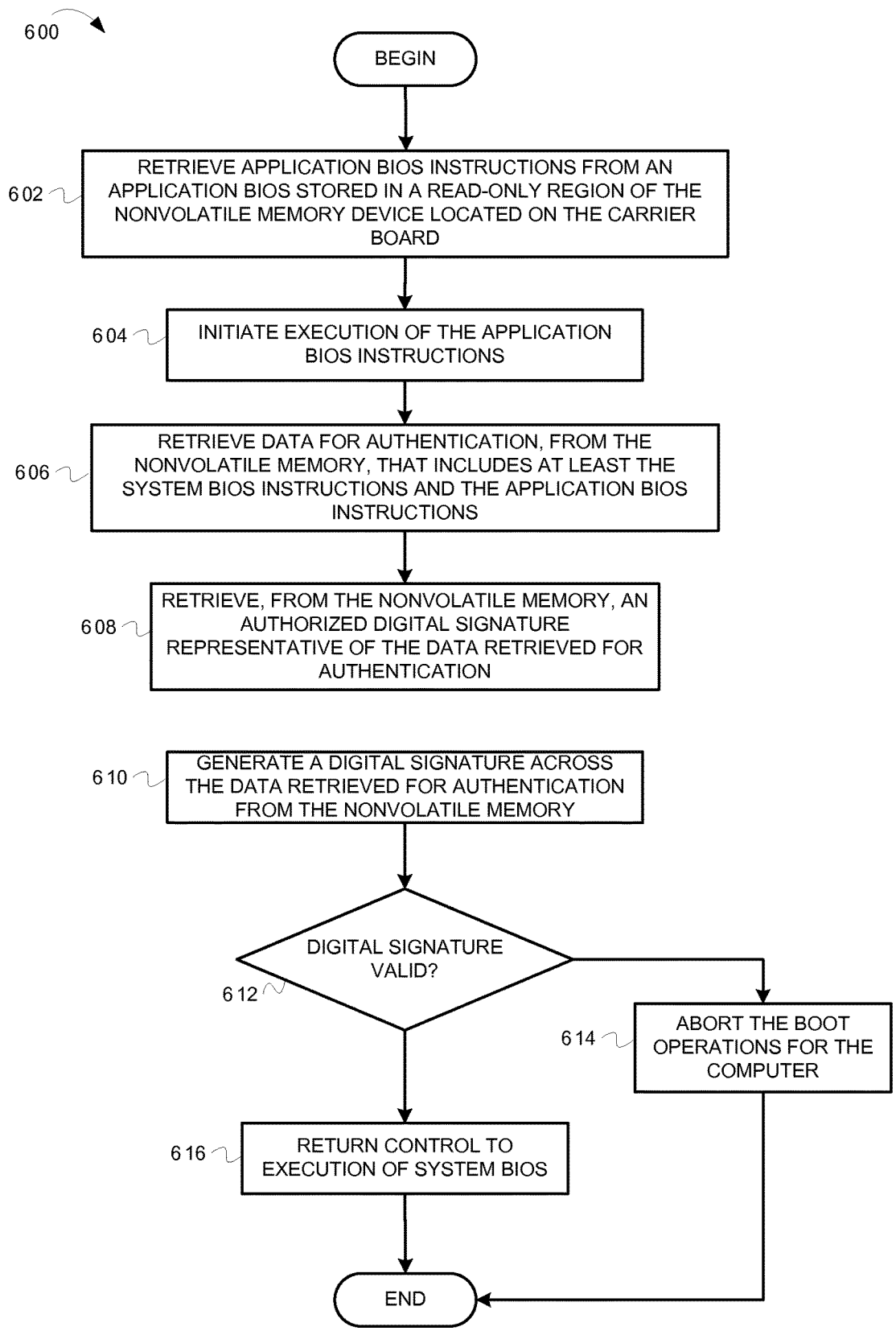
FIG. 6 is a flowchart of operations for execution of a BIOS extension code for protection and authentication of BIOS code in a computer, according to some example embodiments.

The operations for execution of the application BIOS are now described. In particular, FIG. 6 is a flowchart of operations for execution of a BIOS extension code for protection and authentication of BIOS code in a computer, according to some example embodiments. A flowchart 600 includes operations that, in some example embodiments, are performed by components of the computer architectures shown in FIGS. 1-2. The operations of the flowchart 600 can start in response to a call by the system BIOS during the boot up operations (see block 510 of FIG. 5 described above). The operations of the flowchart 600 begin at block 602.

At block 602, the processor 108 retrieves application BIOS instructions from an application BIOS stored in a read-only region of the nonvolatile memory 114 located on the carrier board 100. The application BIOS instructions can be loaded into the volatile memory 111 (see example memory map in FIG. 4) from the nonvolatile memory 114. As shown, the nonvolatile memory 114 can be a SPI device, wherein communications between the nonvolatile memory 114 and the chipset 110 are through the SPI bus 118. The operations continue at block 604.

At block 604, the processor 108 initiates execution of the application BIOS instructions. The execution of the application BIOS includes a number of different start up operations for the computer. Example operations in response to the execution of the application BIOS are described in the following operations at blocks 606-614. The operations continue at block 606.

At block 606, the processor 108 retrieves the data for authentication, from the nonvolatile memory 114, that includes at least the system BIOS instructions and the application BIOS. In some example embodiments, the processor 108 retrieves all of the data stored in the nonvolatile memory 114, except for the data stored in the region 312 that is configured to store the authorized digital signatures. In particular in some example embodiments, the processor 108 retrieves the data stored in the regions 302-310. The operations continue at block 608.

At block 608, the processor 108 retrieves, from the nonvolatile memory 114, an authorized digital signature representative of the data retrieved for authentication from the nonvolatile memory 114. The operations continue at block 610.

At block 610, the processor 108 generates a digital signature across the data retrieved for authentication from the nonvolatile memory 114. As described above, the digital signature can be based on any number of different cryptographic algorithms (e.g., versions of SHA, MD, etc.). The processor 108 can generate the digital signature using a public key that is stored in any number of different media. For example, the public key can be stored in the nonvolatile memory 114 (e.g., storage in region 312 or a separate region not shown in FIG. 3), volatile memory 111, etc. The operations continue at block 612.

At block 612, the processor 108 determines whether the generated digital signature is valid. In particular, the processor 108 can compare the generated digital signature to the authorized digital signature retrieved from the nonvolatile memory 114. If the generated digital signature is equal to the authorized digital signature, the digital signature can be considered valid. If the generated digital signature is not valid, the operations at block 614. Otherwise, the operations continue at block 616.

At block 614, the processor 108 aborts the boot operations for the computer. In particular, the processor 108 does not allow the boot operations to continue and the computer cannot start normal operations. As part of the abort, the processor 108 can perform different operations, including one or more of the following: 1) generate an error message for display on a screen of the computer, 2) generate a error message for storage in an error log stored in a nonvolatile memory of the computer, 3) power down of the computer, etc. The operations of the flowchart 600 are complete.

At block 614, the processor 108 returns control to execution of the system BIOS. In this example, the operations would continue at block 512 of the flowchart 500 of FIG. 5. The operations of the flowchart 600 are complete.

Figure 7:
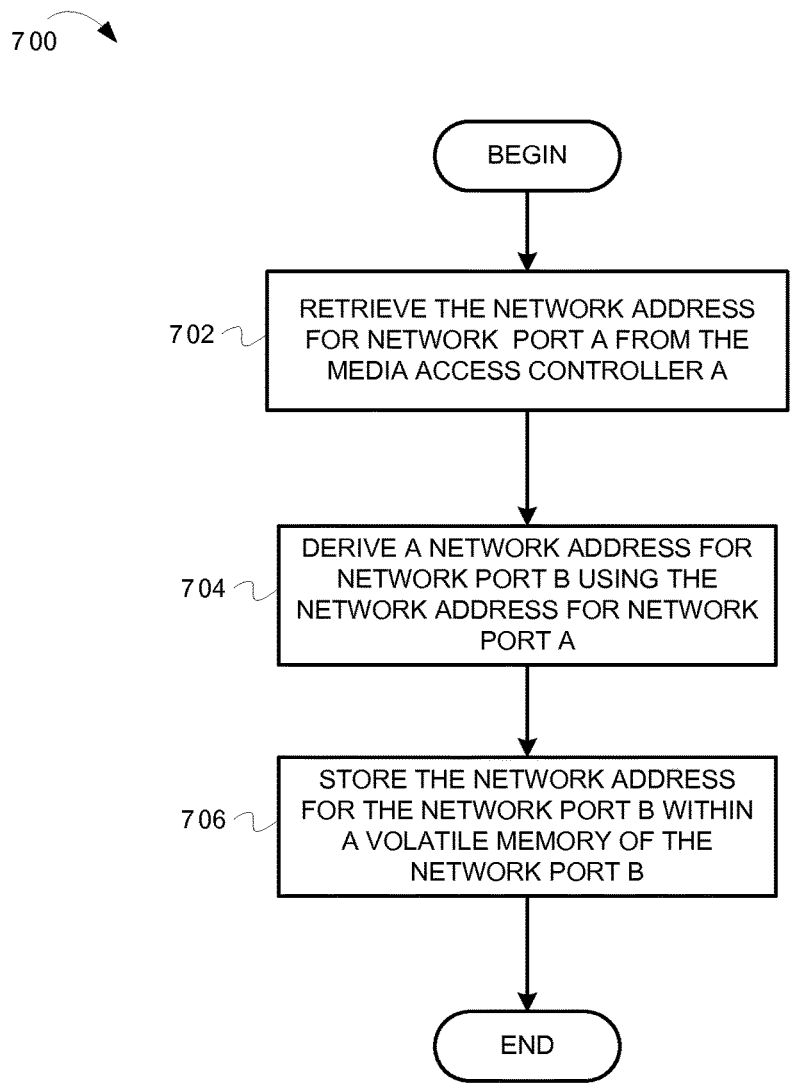
FIG. 7 is a flowchart of operations for assigning a network address to a network port based on a network address from a different network port, according to some example embodiments.

FIG. 7 is a flowchart of operations for assigning a network address to a network port based on a network address from a different network port, according to some example embodiments. In some example embodiments, the operating system executing on the processor 108 performs the operations of the flowchart 700. The operating system can perform these operations at boot-up. For example with reference to FIG. 5, the operating system can perform these operations after being loaded at block 512. The operations of the flowchart 700 begin at block 702.

At block 702, the operating system retrieves the network address for network port A from the media access controller for the network port A. With reference to FIG. 1, the operating system retrieves the network address over the bus 190 from the media access controller A 150. The media access controller A 150 has already loaded the network port A address into the volatile memory 151 from the nonvolatile memory 105 after the media access controller A 150 was powered on (as described above). Therefore, the media access controller A 150 can provide the network address from the volatile memory 151. The operations continue at block 704.

At block 704, the operating system derives a network address for network port B using the network address for network port A. In some example embodiments, the operating system adds some offset (e.g., one, one thousand, etc.) to the network address for network port A to create the network address for network port B. The operations continue at block 706.

At block 706, the operating system stores the network address for the network port B within a volatile memory of the network port B. With reference to FIG. 1, the operating system can provide this network address for the network port B to the media access controller B 152. The media access controller B 152 can then store this network address into the volatile memory 154. The operations of the flowchart 700 are complete.

Accordingly, the network port B is disabled until the operations shown in FIG. 7 are performed during boot up. In some example embodiments, the network port A is configured such that it is disabled until after initialization during boot up (as described above). Therefore, because both network ports are disabled until boot up, remote devices may have difficulty initiating a remote boot up of the computer shown in FIGS. 1 and 2. Preventing a remote boot provides another layer security for a wagering game machine that is coupled to a network.

Example Physical Representation of a Nonvolatile Memory

This section describes an example physical representation of an adapter that includes the nonvolatile memory 114 of FIG. 1 that is configured to store the BIOS-related data. This section also describes an example of a portion of the carrier board 100 where the adapter is positioned. In some example embodiments, the size of the nonvolatile memory 114 is approximately 0.25 to 0.40 millimeters. Because of the small size of the nonvolatile memory 114, a technician can have a difficult time handling the nonvolatile memory 114 to remove and reinsert as part authentication of the data stored therein by a trusted verification device. Accordingly, this example physical representation of an adapter enables a technician to more easily handle the nonvolatile memory 114.

Figure 8:
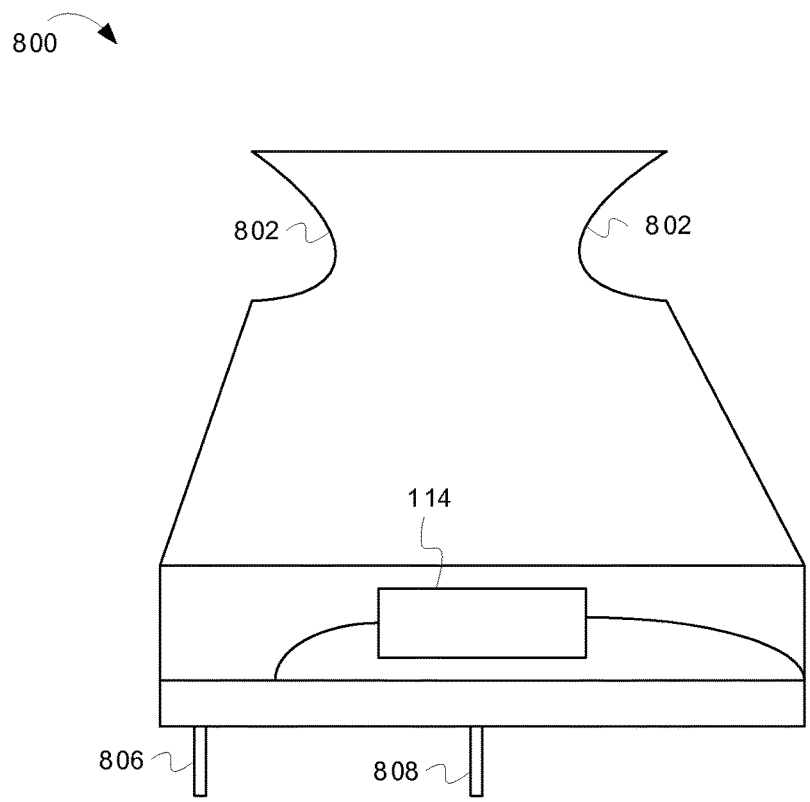
FIG. 8 is a diagram illustrating a side view of a physical representation of an adapter that includes the nonvolatile memory that is configured to store a BIOS code for a computer, according to some example embodiments.

FIG. 8 is a diagram illustrating a side view of a physical representation of an adapter that includes the nonvolatile memory that is configured to store a BIOS code for a computer, according to some example embodiments. An adapter 800 includes the nonvolatile memory 114 that stores the BIOS-related data (see description of FIG. 1). The adapter 800 includes handles 802 to enable a technician to more easily remove and insert the nonvolatile memory 114 from and to the carrier board 100. In particular, a small size of the nonvolatile memory 114 can make handling (including removal and insertion from the carrier board) very difficult. Accordingly, the adapter 800 encloses the nonvolatile memory 114 in such a configuration to enable handling of the nonvolatile memory 114 easier using the handles 802. The adapter 800 also includes a row of pins 806 and a row of pins 808. In some example embodiments, each row of pins includes 4 pins. The row of pins 806 and the row of pins 808 are inserted into a socket of the carrier board 100. Also, this eight pin configuration of the adapter 800 enables the adapter 800 to be inserted into a trusted verification device for independent authentication.

Figure 9:
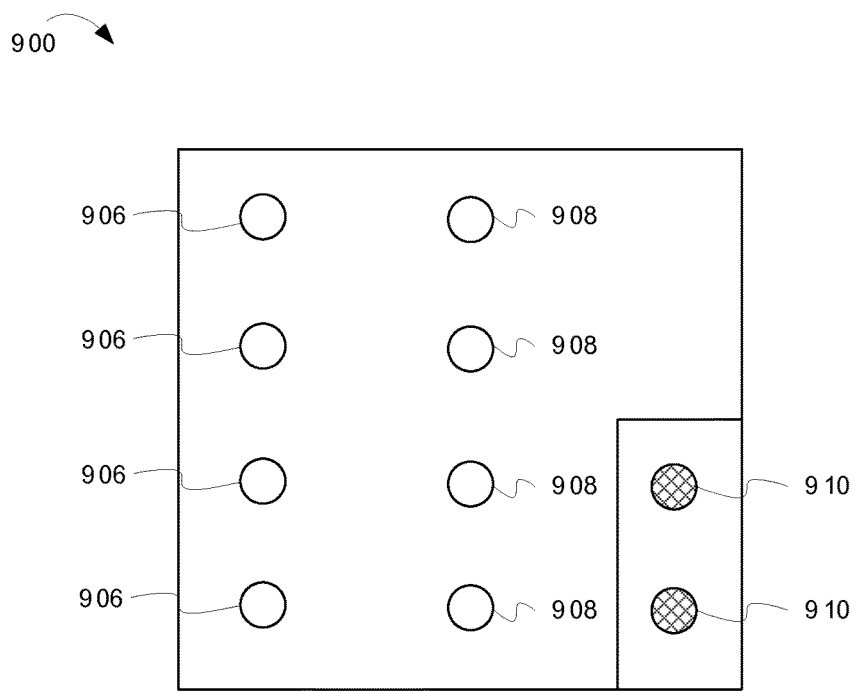
FIG. 9 is a diagram illustrating a top view of a part of the carrier board configured to receive an adapter that includes the nonvolatile memory that is configured to store a BIOS code for a computer, according to some example embodiments.

FIG. 9 is a diagram illustrating a top view of a part of the carrier board configured to receive an adapter that includes the nonvolatile memory that is configured to store a BIOS code for a computer, according to some example embodiments. A portion 900 of the carrier board 100 includes a socket that includes a row of receptacles 906 and a row of receptacles 908. The row of receptacles 906 is configured to receive the row of pins 806 of the adapter 800. The row of receptacles 908 is configured to receive the row of pins 808 of the adapter 800. Also, the portion 900 of the carrier board 100 includes two pins 910 that extend out from the carrier board 100. The pins 910 are to be inserted into two receptacles (not shown) on the bottom of the adapter 800. Accordingly, the adapter 800 can only be inserted one way into the portion 900 of the carrier board. The pins 910 preclude the adapter 800 from being inserted incorrectly. In particular, the pins 910 preclude the adapter 800 from being inserted such that the row of pins 806 are inserted into the row of receptacles 908 and the row of pins 808 are inserted into the row of receptacles 906. The pins 910, therefore, providing a socket keying configuration for proper placement of the adapter 800 onto the portion 900 of the carrier board 100.

Example Operating Environment

This section describes an example operating environment and presents structural aspects of some embodiments. This section includes discussion about wagering game machine architectures.

Wagering Game Machine Architecture

Figure 10:
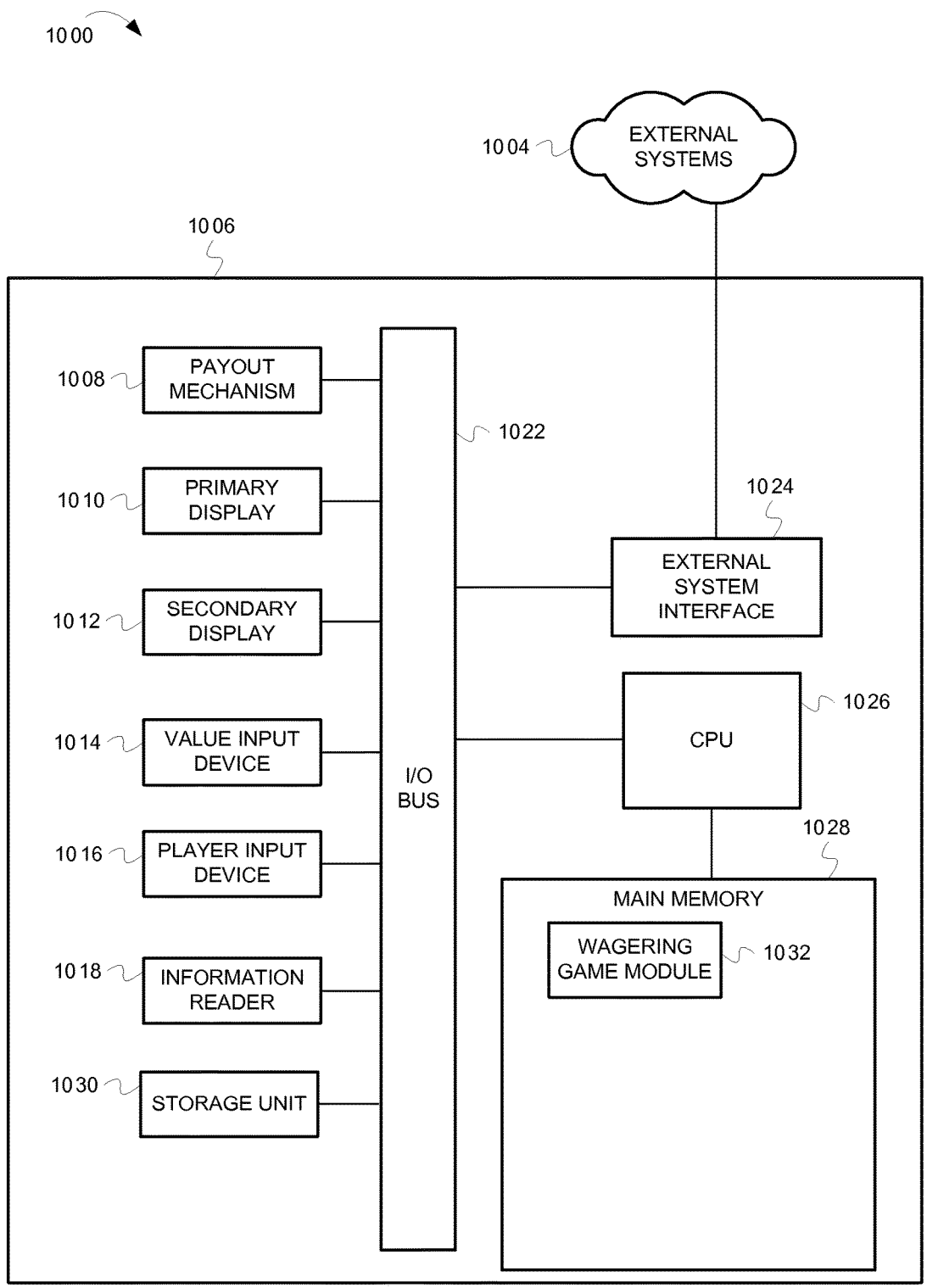
FIG. 10 is a block diagram illustrating a wagering game machine architecture, according to some example embodiments.

FIG. 10 is a block diagram illustrating a wagering game machine architecture, according to example embodiments of the invention. As shown in FIG. 10, the wagering game machine architecture 1000 includes a wagering game machine 1006, which includes a central processing unit (CPU) 1026 connected to main memory 1028. The CPU 1026 can include any suitable processor, such as an Intel® Core™ i3 processor, an Intel® Core™ i5 processor, an Intel® Core™ i7 processor, an Intel® Pentium processor, Intel® Core 2 Duo processor, AMD Opteron™ processor, or UltraSPARC processor. The main memory 1028 includes a wagering game unit 1032. In one embodiment, the wagering game unit 1032 can present wagering games, such as video poker, video blackjack, video slots, video lottery, etc., in whole or part.

The CPU 1026 is also connected to an input/output (I/O) bus 1022, which can include any suitable bus technologies, such as an AGTL+ frontside bus and a PCI backside bus. The I/O bus 1022 is connected to a payout mechanism 1008, primary display 1010, secondary display 1012, value input device 1014, player input device 1016, information reader 1018, and storage unit 1030. The player input device 1016 can include the value input device 1014 to the extent the player input device 1016 is used to place wagers. The I/O bus 1022 is also connected to an external system interface 1024, which is connected to external systems 1004 (e.g., wagering game networks).

In some embodiments, the wagering game machine 1006 can include the components described in FIG. 1 or 2. In such embodiments, the processor 1026 and other components can reside on a COMe board, as described above. Furthermore, the wagering game machine 1006 can perform the operations described above.

In one embodiment, the wagering game machine 1006 can include additional peripheral devices and/or more than one of each component shown in FIG. 10. For example, in one embodiment, the wagering game machine 1006 can include multiple external system interfaces 1024 and/or multiple CPUs 1026. In one embodiment, any of the components can be integrated or subdivided.

Any component of the architecture 1000 can include hardware, firmware, and/or machine-readable storage media including instructions for performing the operations described herein. Machine-readable storage media includes any mechanism that stores and provides information in a form readable by a machine (e.g., a wagering game machine, computer, etc.). For example, machine-readable storage media include read only memory (ROM), random access memory (RAM), magnetic disk storage media, optical storage media, flash memory machines, etc.

Example Wagering Game Machine

Figure 11:
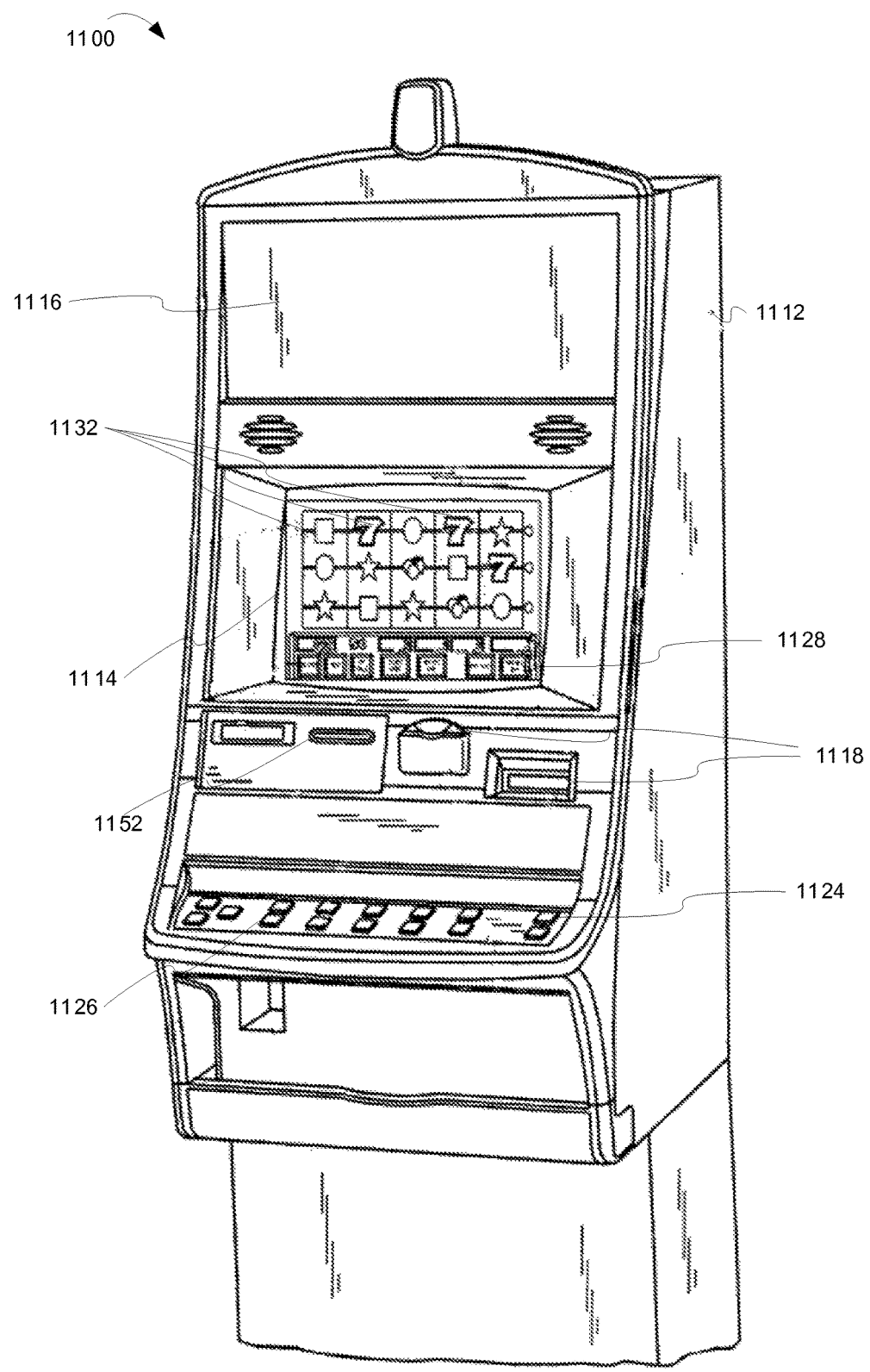
FIG. 11 is a perspective view of a wagering game machine, according to some example embodiments.

FIG. 11 is a perspective view of a wagering game machine, according to example embodiments of the invention. Referring to FIG. 11, a wagering game machine 1100 is used in gaming establishments, such as casinos. According to embodiments, the wagering game machine 1100 can be any type of wagering game machine and can have varying structures and methods of operation. For example, the wagering game machine 1100 can be an electromechanical wagering game machine configured to play mechanical slots, or it can be an electronic wagering game machine configured to play video casino games, such as blackjack, slots, keno, poker, blackjack, roulette, etc.

The wagering game machine 1100 comprises a housing 1112 and includes input devices, including value input devices 1118 and a player input device 1124. For output, the wagering game machine 1100 includes a primary display 1114 for displaying information about a basic wagering game. The primary display 1114 can also display information about a bonus wagering game and a progressive wagering game. The wagering game machine 1100 also includes a secondary display 1116 for displaying wagering game events, wagering game outcomes, and/or signage information. While some components of the wagering game machine 1100 are described herein, numerous other elements can exist and can be used in any number or combination to create varying forms of the wagering game machine 1100.

The value input devices 1118 can take any suitable form and can be located on the front of the housing 1112. The value input devices 1118 can receive currency and/or credits inserted by a player. The value input devices 1118 can include coin acceptors for receiving coin currency and bill acceptors for receiving paper currency. Furthermore, the value input devices 1118 can include ticket readers or barcode scanners for reading information stored on vouchers, cards, or other tangible portable storage devices. The vouchers or cards can authorize access to central accounts, which can transfer money to the wagering game machine 1100.

The player input device 1124 comprises a plurality of push buttons on a button panel 1126 for operating the wagering game machine 1100. In addition, or alternatively, the player input device 1124 can comprise a touch screen 1128 mounted over the primary display 1114 and/or secondary display 1116.

The various components of the wagering game machine 1100 can be connected directly to, or contained within, the housing 1112. Alternatively, some of the wagering game machine's components can be located outside of the housing 1112, while being communicatively coupled with the wagering game machine 1100 using any suitable wired or wireless communication technology.

The operation of the basic wagering game can be displayed to the player on the primary display 1114. The primary display 1114 can also display a bonus game associated with the basic wagering game. The primary display 1114 can include a cathode ray tube (CRT), a high resolution liquid crystal display (LCD), a plasma display, light emitting diodes (LEDs), or any other type of display suitable for use in the wagering game machine 1100. Alternatively, the primary display 1114 can include a number of mechanical reels to display the outcome. In FIG. 11, the wagering game machine 1100 is an "upright" version in which the primary display 1114 is oriented vertically relative to the player. Alternatively, the wagering game machine can be a "slant-top" version in which the primary display 1114 is slanted at about a thirty-degree angle toward the player of the wagering game machine 1100. In yet another embodiment, the wagering game machine 1100 can exhibit any suitable form factor, such as a free standing model, bartop model, mobile handheld model, or workstation console model.

A player begins playing a basic wagering game by making a wager via the value input device 1118. The player can initiate play by using the player input device's buttons or touch screen 1128. The basic game can include arranging a plurality of symbols along a payline 1132, which indicates one or more outcomes of the basic game. Such outcomes can be randomly selected in response to player input. At least one of the outcomes, which can include any variation or combination of symbols, can trigger a bonus game.

In some embodiments, the wagering game machine 1100 can also include an information reader 1152, which can include a card reader, ticket reader, bar code scanner, RFID transceiver, or computer readable storage medium interface.

In some embodiments, the information reader 1152 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A wagering game machine comprising:
   a carrier board;
   one or more processors located on the carrier board;
   a first nonvolatile memory located on the carrier board, the first nonvolatile memory communicatively coupled to the one or more processors, wherein the first nonvolatile memory is configured to store Basic Input and Output System (BIOS) code that includes a system BIOS code and a BIOS extension code;
   a first network port located on the carrier board and having a first network address stored in a second nonvolatile memory;
   a second network port having a second network address that is derived from the first network address during boot up operations of the wagering game machine and in response to execution of the BIOS code and after authentication of the BIOS code, wherein the first network address and the second network address are preallocated;
   a first media access controller configured to control access to the first network port, wherein the first network address is inaccessible by the first media access controller until the first media access controller is initialized;
   a second media access controller configured to control access to the second network port, wherein the second network address is inaccessible by the second media access controller until the second media access controller is initialized; and
   a wagering game module, executable by the one or more processors, configured to present a wagering game on which monetary value can be wagered to a wagering game player, after execution of the system BIOS code and the BIOS extension code.

2. The wagering game machine of claim 1, wherein the first nonvolatile memory is configured to store a digital signature and an encryption key, wherein the digital signature comprises a hash across at least the system BIOS code and the BIOS extension code.

3. The wagering game machine of claim 1, further comprising an embedded computer module that is positioned on the carrier board, wherein the one or more processors are positioned on the embedded computer module.

4. The wagering game machine of claim 3, wherein the second network port is located on the embedded computer module.

5. The wagering game machine of claim 1, wherein the second network address is not stored in the first nonvolatile memory.

6. The wagering game machine of claim 1, wherein the first nonvolatile memory is attach to a socket of the carrier board such that the first nonvolatile memory is removable for authentication of the BIOS code by a trusted verification device.

7. The wagering game machine of claim 6, wherein the first nonvolatile memory is to store a data image that includes the BIOS code, wherein a different nonvolatile memory that is to attach to a different socket of a different carrier board in a different wagering game machine is to store a different data image that includes a different BIOS code, wherein the trusted verification device is to use a same digital signature to authenticate both the data image and the different data image.

8. The wagering game machine of claim 1, wherein the second network address is derived from the first network address as part of execution of the BIOS code.

\* \* \* \* \*